United States Patent
Bazzica (10) Patent No.: US 10,717,215 B2
(45) Date of Patent: Jul. 21, 2020

(54) METHOD AND MOLD FOR MOLDING A COLLAPSIBLE, FOAM PLASTIC CONTAINER

(71) Applicant: Bazzica Engineering S.r.l., Trevi (IT)

(72) Inventor: Carlo Bazzica, Foligno (IT)

(73) Assignee: BAZZICA ENGINEERING S.R.L., Trevi (IT)

(*) Notice: Subject to any disclaimer, the term of this patent is extended or adjusted under 35 U.S.C. 154(b) by 769 days.

(21) Appl. No.: 15/029,149

(22) PCT Filed: Oct. 14, 2014

(86) PCT No.: PCT/IB2014/065312
§ 371 (c)(1),
(2) Date: Apr. 13, 2016

(87) PCT Pub. No.: WO2015/056181
PCT Pub. Date: Apr. 23, 2015

(65) Prior Publication Data
US 2016/0257042 A1    Sep. 8, 2016

(30) Foreign Application Priority Data
Oct. 14, 2014 (IT) .............................. TO2013A0826

(51) Int. Cl.
*B29C 45/00* (2006.01)
*B65D 1/22* (2006.01)
(Continued)

(52) U.S. Cl.
CPC ...... *B29C 45/0081* (2013.01); *B29C 37/0057* (2013.01); *B29C 44/0446* (2013.01);
(Continued)

(58) Field of Classification Search
None
See application file for complete search history.

(56) References Cited

U.S. PATENT DOCUMENTS 3,825,637 A    7/1974 Robin
4,104,349 A *  8/1978 Hillgenberg .............. B26F 1/40
                                                      264/153

FOREIGN PATENT DOCUMENTS

JP     H04147833       5/1992
WO     WO 2010/111729 A1  10/2010
(Continued)

OTHER PUBLICATIONS

International Search Report and Written Opinion for International Application No. PCT/IB2014/065312 dated Jan. 27, 2015.
(Continued)

*Primary Examiner* — Monica A Huson
*Assistant Examiner* — Kelsey C Grace
(74) *Attorney, Agent, or Firm* — Neal, Gerber & Eisenberg LLP (57) ABSTRACT

A method of molding a collapsible, foam plastic container; the method employs two half-molds defining a molding chamber negatively reproducing the container in an erect work configuration, and forms a hinge for each lateral wall of the container when molding the container; each hinge being formed by a parting member which is inserted through the molding chamber at the hinge to be formed, and by a compression member opposite the parting member and which is moved towards the parting member to form, on the lateral wall, a small-section, higher-density portion defining the respective hinge.

6 Claims, 5 Drawing Sheets

(51) Int. Cl.
- *B29C 44/04* (2006.01)
- *B29C 44/58* (2006.01)
- *B29C 37/00* (2006.01)
- *B29C 45/26* (2006.01)
- B29L 31/00 (2006.01)
- B29L 31/22 (2006.01)
- B29C 45/17 (2006.01)
- B29K 105/04 (2006.01)

(52) U.S. Cl.
CPC ............ *B29C 44/585* (2013.01); *B29C 45/26* (2013.01); *B65D 1/225* (2013.01); B29C 2045/1785 (2013.01); B29C 2045/2695 (2013.01); B29K 2105/04 (2013.01); B29L 2031/22 (2013.01); B29L 2031/712 (2013.01)

(56) References Cited

FOREIGN PATENT DOCUMENTS

| WO | WO 2012/028567 A1 | 3/2012 | |
|---|---|---|---|
| WO | WO-2012028567 A1 * | 3/2012 | ............. B65D 1/225 |

OTHER PUBLICATIONS

Notification Concerning Submission, Obtention or Transmittal of Priority Document (Form PCT/IB/304) for International Application No. PCT/IB2014/065312 dated Jan. 7, 2015.

\* cited by examiner

METHOD AND MOLD FOR MOLDING A COLLAPSIBLE, FOAM PLASTIC CONTAINER

PRIORITY CLAIM

This application is a national stage application of PCT/IB2014/065312, filed on Oct. 14, 2014, which claims the benefit of and priority to Italian Patent Application No. TO2013A000826, filed on Oct. 14, 2013, the entire contents of which are each incorporated by reference herein.

BACKGROUND

The foam plastic material referred to above is normally a foam polymer, such as polypropylene, polyethylene, polystyrene and copolymers thereof.

A container of this sort is known, for example, from PCT Patent Application No. WO-A-2012028567.

Collapsible containers molded from foam plastic are known, which can be folded from an erect work configuration to a relatively highly compact, relatively space-saving, flat configuration for transport or storage when not in use. Accordingly, collapsible containers of this sort are normally parallelepiped-shaped, and comprise a bottom wall, and four lateral walls hinged to the bottom wall so as to fold inwards or outwards of the container, onto the bottom wall or into a position coplanar with the bottom wall, and so flatten the container.

Containers of this sort are usually molded in the form of a blank (i.e., a flat, contoured sheet with thinner areas connecting the lateral walls to the bottom wall, and which act as hinges by which to rotate the lateral walls with respect to the bottom wall). The container is therefore produced in the flat configuration and folded into the erect configuration for use. The walls of the container normally have appendages which fit together and act as fasteners in the erect configuration, to achieve a rigid, but at the same time easily collapsible, container.

Though relatively simple, and for this reason relatively widely used, the above production method has the major drawback of the blank—especially when producing relatively very large containers—requiring a relatively extremely large, and therefore bulky, relatively difficult to handle, mold.

SUMMARY

The present disclosure relates to a method and mold configured to mold a collapsible foam plastic container, and to the container so formed.

It is an advantage of the present disclosure to provide a method of molding a collapsible foam plastic container, configured to minimize certain of the above drawbacks.

According to certain embodiments of the present disclosure, there is provided a method of molding a collapsible foam plastic container including a bottom wall, two facing first lateral walls, and two facing second lateral walls substantially perpendicular to the first lateral walls, the lateral walls movable between a work configuration in which the first and second lateral walls are substantially perpendicular to one another and to the bottom wall, and a flat rest configuration in which the first and second lateral walls are substantially parallel to one another and to the bottom wall. The method of this embodiment includes preparing a mold including a first half-mold and a second half-mold movable with respect to each other to and from a closed molding position in which the two half-molds define, between them, a molding chamber, closing the two half-molds to define the molding chamber, and filling the molding chamber with a plastic material by feeding a designated quantity of the plastic material into a plurality of chambers in communication with the molding chamber. The method of this embodiment further includes forming, for each lateral wall, a hinge configured to enable the lateral wall to rotate with respect to the bottom wall, wherein each hinge is formed utilizing a forming device including: (i) for each hinge to be formed, a parting member activated to move between a rest position outside the molding chamber and a work position in which the parting member penetrates the molding chamber at a location corresponding to the hinge to be formed, and (ii) a compression member located on an opposite side of the molding chamber to the parting member, the compression member being activated to move between a rest position outside the molding chamber and a work position in which the compression member: (A) compresses a quantity of the plastic material towards the parting member, and (B) cooperates with the parting member to form, on the lateral wall, a relatively higher-density portion defining the hinge, wherein each compression member is movably mounted inside a respective one of the chambers and is moved inside the chamber to push the plastic material in the chamber into the molding chamber and towards the respective parting member. The method of this embodiment includes opening the half-molds, and removing the molded container.

According to certain embodiments of the present disclosure, there is also provided a mold configured to mold a collapsible foam plastic container including a bottom wall, two facing first lateral walls, and two facing second lateral walls substantially perpendicular to the first lateral walls, the lateral walls movable between a work configuration in which the first and second lateral walls are substantially perpendicular to one another and to the bottom wall, and a flat rest configuration in which the first and second lateral walls are substantially parallel to one another and to the bottom wall. The mold of this embodiment includes a first half-mold, and a second half-mold, wherein the first half-mold and the second half-mold are movable with respect to each other to and from a closed molding position in which the two half-molds define, between them, a molding chamber, the molding chamber being in communication with a chamber which is filled with a designated quantity of material when the molding chamber is filled. The mold of this embodiment includes a forming device configured to form, for each lateral wall, a hinge which enables the lateral wall to rotate with respect to the bottom wall, the forming device including: for each hinge to be formed, a parting member movable between a rest position outside the molding chamber and a work position in which the parting member extends inside the molding chamber at a location corresponding to the hinge to be formed, and a compression member located on an opposite side of the molding chamber to the parting member and which is movable between a rest position outside the molding chamber and a work position in which the compression member: (i) compresses a quantity of plastic material towards the parting member, and (ii) cooperates with the parting member to form, on the lateral wall, a relatively higher-density portion defining the hinge, wherein each compression member includes a pad which extends facing the respective parting member on the opposite side of the molding chamber and slidably engages a channel formed in the second half-mold.

Additional features and advantages are described in, and will be apparent from the following Detailed Description and the figures.

BRIEF DESCRIPTION OF THE DRAWINGS

A non-limiting embodiment of the disclosure will be described by way of example with reference to the attached drawings, in which.

DETAILED DESCRIPTION

Figure 1:
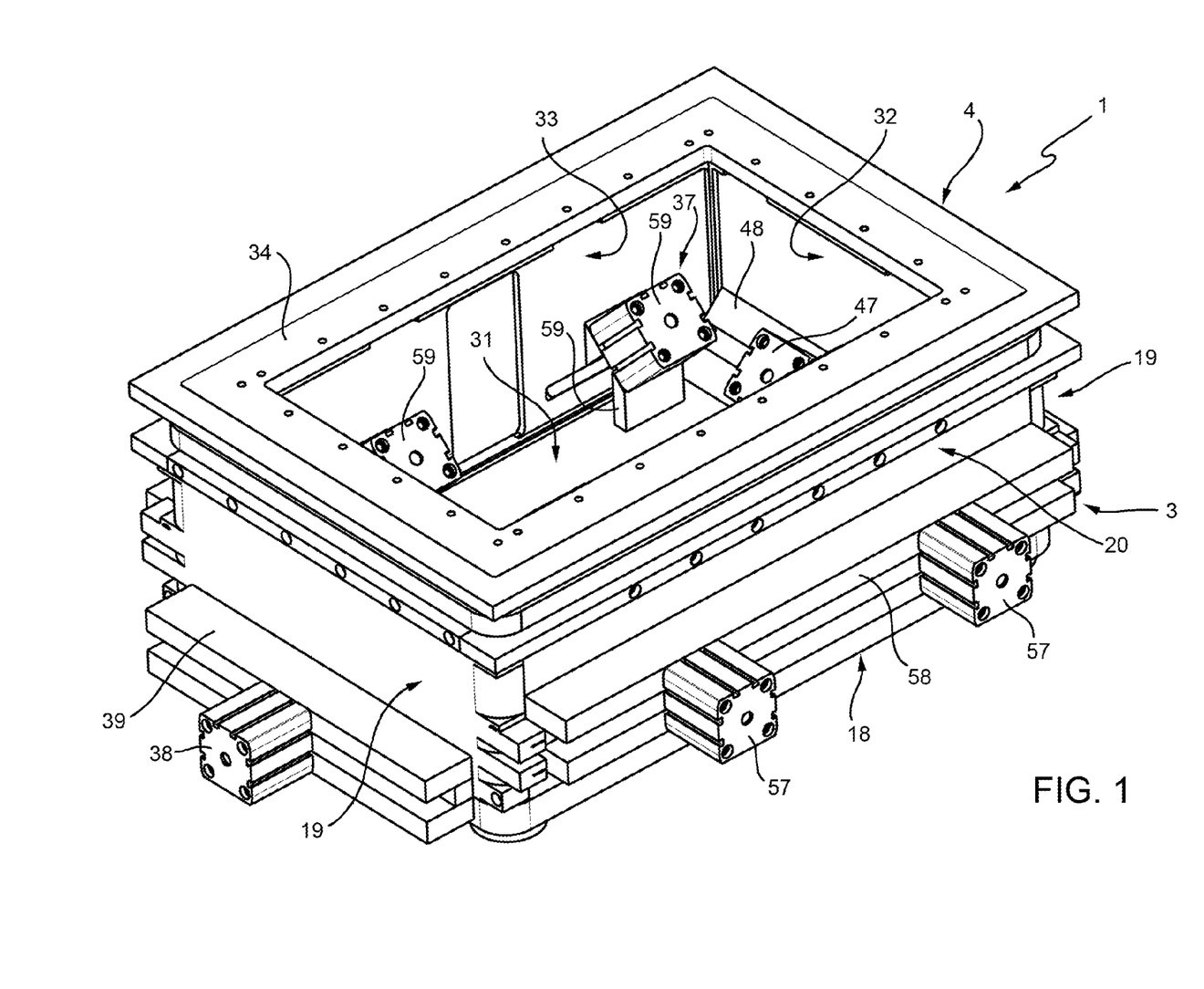
FIG. 1 shows a view in perspective of one embodiment of the mold according to the present disclosure.

Referring now to the example embodiments of the present disclosure illustrated in FIGS. 1 to 7, number 1 in FIG. 1 indicates as a whole a mold configured for use on a machine (not shown) configured to mold foam plastic, such as polypropylene, polyethylene, polystyrene and copolymers thereof, to produce a collapsible container 2 (FIG. 2) configured to transport products.

Mold 1 comprises two half-molds 3 and 4, which in use are mounted facing each other on a frame of the molding machine (not shown) so as to move with respect to each other to and from a closed molding position, in which half-molds 3 and 4 form a molding chamber 5 defining the shape of container 2.

In the example shown (FIG. 2), container 2 is in the form of a parallelepiped-shaped box. and comprises a substantially rectangular bottom wall 6; and four lateral walls: two opposite walls 7 along respective short sides of bottom wall 6, and two opposite walls 8 crosswise to walls 7 and along respective long sides of bottom wall 6. On the face facing outwards of container 2, each wall 7 has a recess 9 defining a user handgrip by which to lift container 2.

Figures 2, 3:
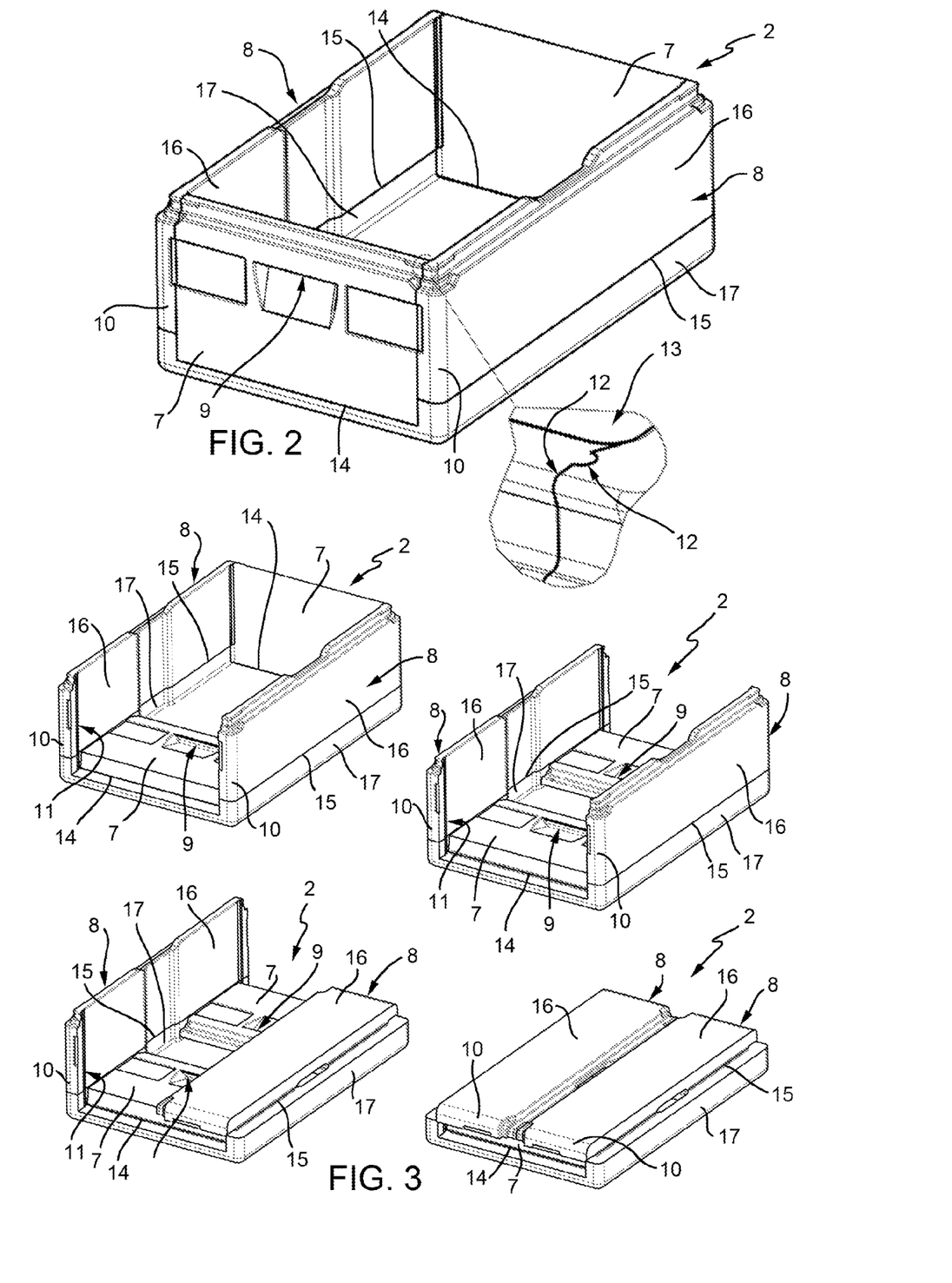
FIG. 2 shows a view in perspective of a container produced using the method according to the present disclosure.
FIG. 3 shows the FIG. 2 container in four different assembly configurations.

As shown in FIG. 3, container 2 has a collapsible structure (i.e., can be folded from the erect configuration in FIG. 2 into a flat configuration (bottom-right image in FIG. 3), in which lateral walls 7 and 8 are folded inwards of container 2, on top of one another and onto bottom wall 6).

Accordingly, walls 7 and 8 are mounted to rotate with respect to bottom wall 6, and are joined firmly to one another by releasable joints enabling container 2 to be assembled and disassembled repeatedly.

More specifically, walls 7 are shorter in length than the respective short sides of bottom wall 6, and are located inwards of walls 8; and, at each end adjacent to a relative wall 7, each wall 8 has an L-shaped corner portion 10, which connects the end of wall 8 to the corresponding end of wall 7, and terminates in an S-shaped surface 11 extending parallel to respective wall 8 and which cooperates in complementary manner with a respective end surface 12 of wall 7. As shown more clearly in the FIG. 2 detail, the end portion of wall 7 terminating with surface 11 and the end portion of wall 8 terminating with respective surface 12 join to define a recessed joint 13 preventing wall 7 from collapsing inwards or outwards of container 2, and wall 8 from collapsing outwards. In addition to joint 13, wall 8 is also prevented from collapsing inwards of container 2 by wall 7 connected to wall 8 being located inwards of it.

Each wall 7, 8 has a longitudinal hinge by which to rotate, with respect to bottom wall 6, inwards of container 2.

More specifically, as shown in FIG. 3, where wall 7 joins to bottom wall 6, each wall 7 is hinged to rotate about a hinge 14 which extends along the bottom inner edge of wall 7, in a direction parallel to wall 7 and perpendicular to walls 8, and is defined by a portion of foam material thinner than a thickness 's1' of wall 7 and more compacted than the material of wall 7. Each hinge 14 therefore serves to enable respective wall 7 to rotate with respect to bottom wall 6, as well as to connect wall 7 and bottom wall 6 permanently and seamlessly to each other.

Each wall 8, on the other hand, rotates about a hinge 15 which is located at a distance from bottom wall 6 equal to the thickness 's' of walls 7, is parallel to wall 8 and perpendicular to walls 7, and is defined by a constriction in wall 8 more compacted than the rest of wall 8 and extending along the inner face of wall 8, facing the other wall 8. In other words, each hinge 15 defines, on respective wall 8, a fixed portion 16 contiguous to bottom wall 6 and of a height substantially equal to the thickness 's' of walls 7, and a movable portion 17 hinged and connected seamlessly to fixed portion 16 by hinge 15.

As shown in FIG. 3, to collapse container 2 into the flat configuration, the location of hinges 14 of walls 7 and hinges 15 of walls 8 enable walls 7 to be folded first inwards of container 2 onto bottom wall 6, and then walls 8 to be folded inwards onto walls 7. In this connection, it should be pointed out that joints 13 connecting walls 7 and 8 are released by simply elastically deforming the material locally by pushing walls 7 from the outside towards the center of container 2. As pressure is exerted on walls 7, release of joints 13 may be assisted by simultaneously pulling walls 8 slightly outwards, away from walls 7.

Figure 4:
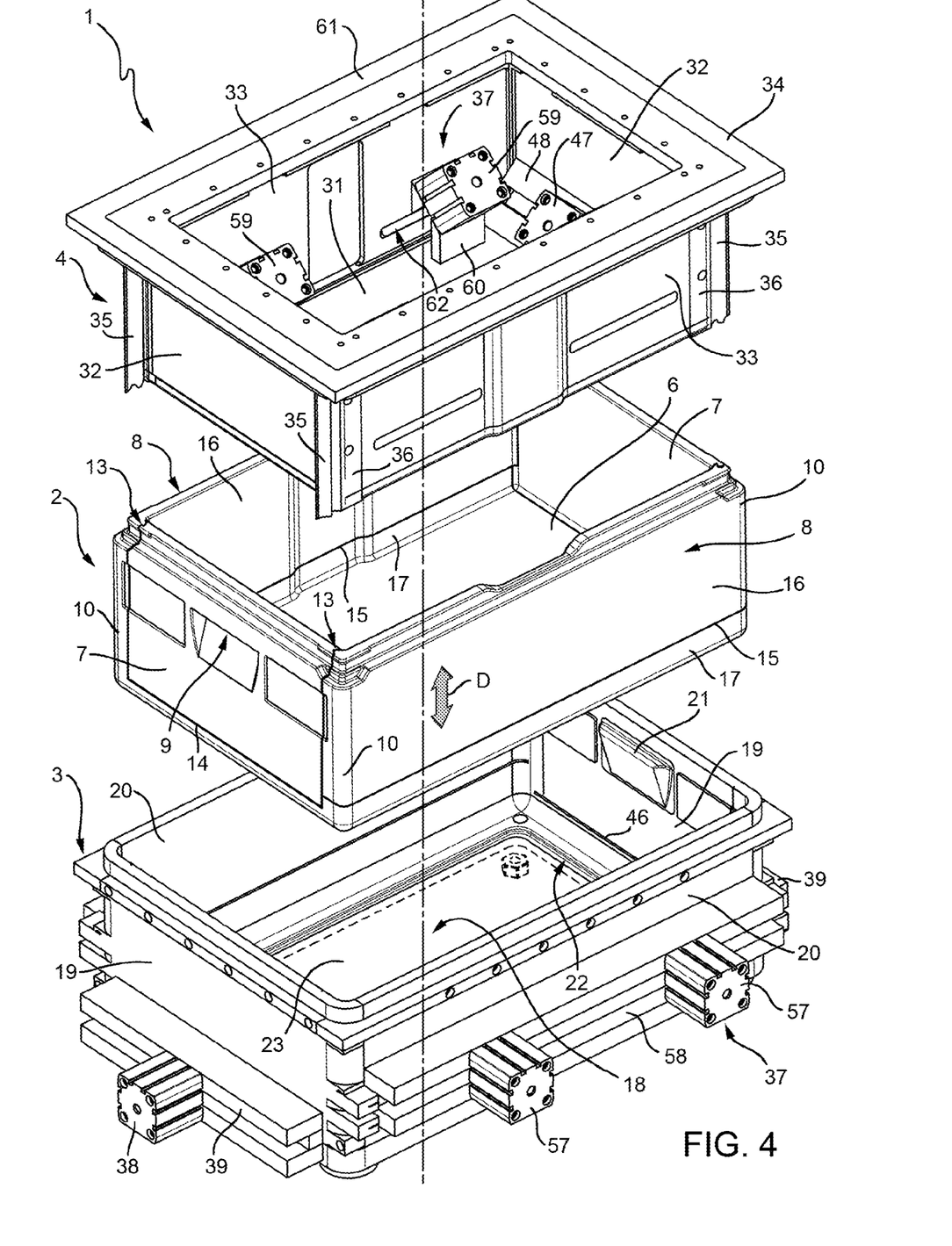
FIG. 4 shows an exploded view in perspective of the FIG. 1 mold and FIG. 2 container.
Figure 5:
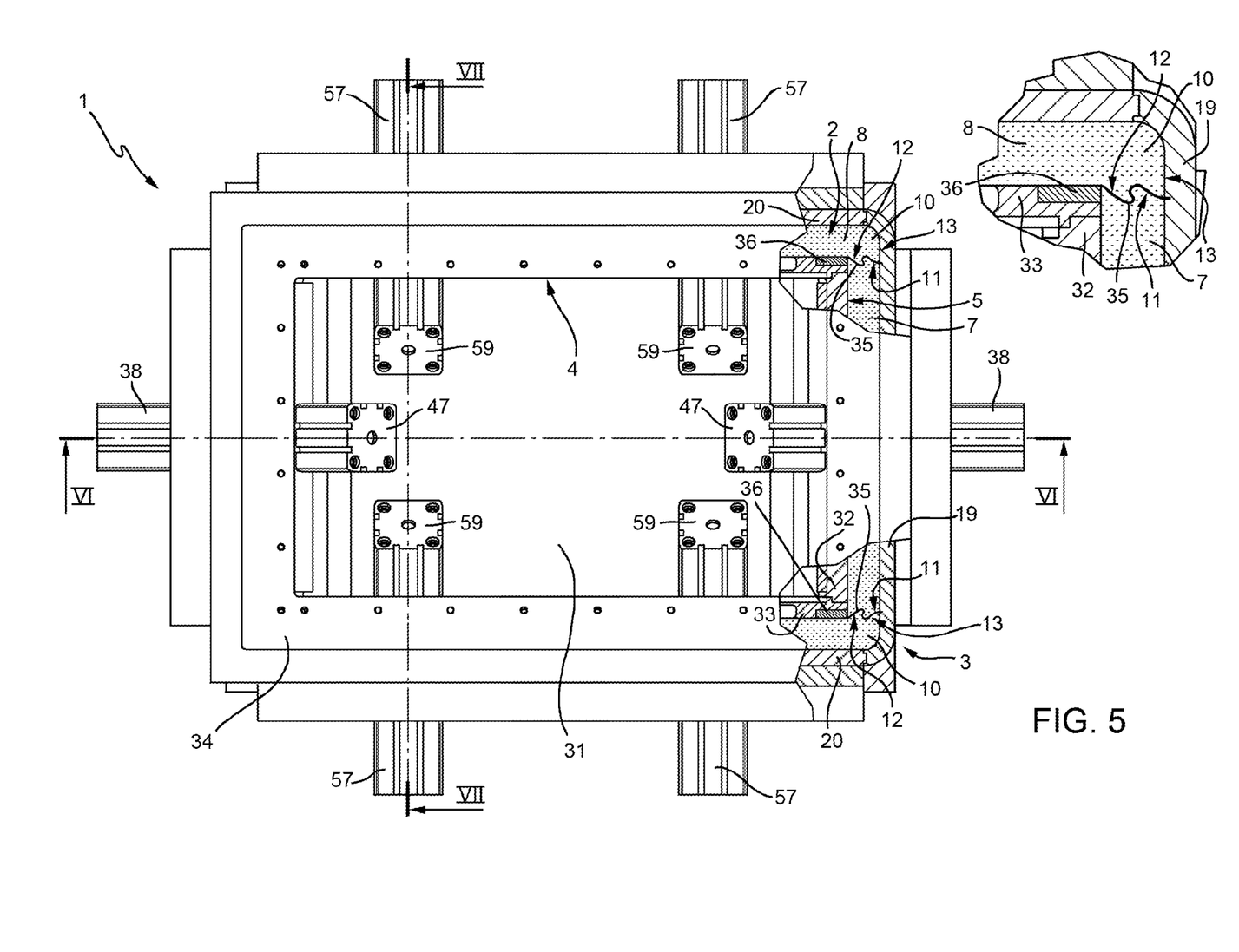
FIG. 5 shows a plan view of the FIG. 1 mold.
Figure 6:
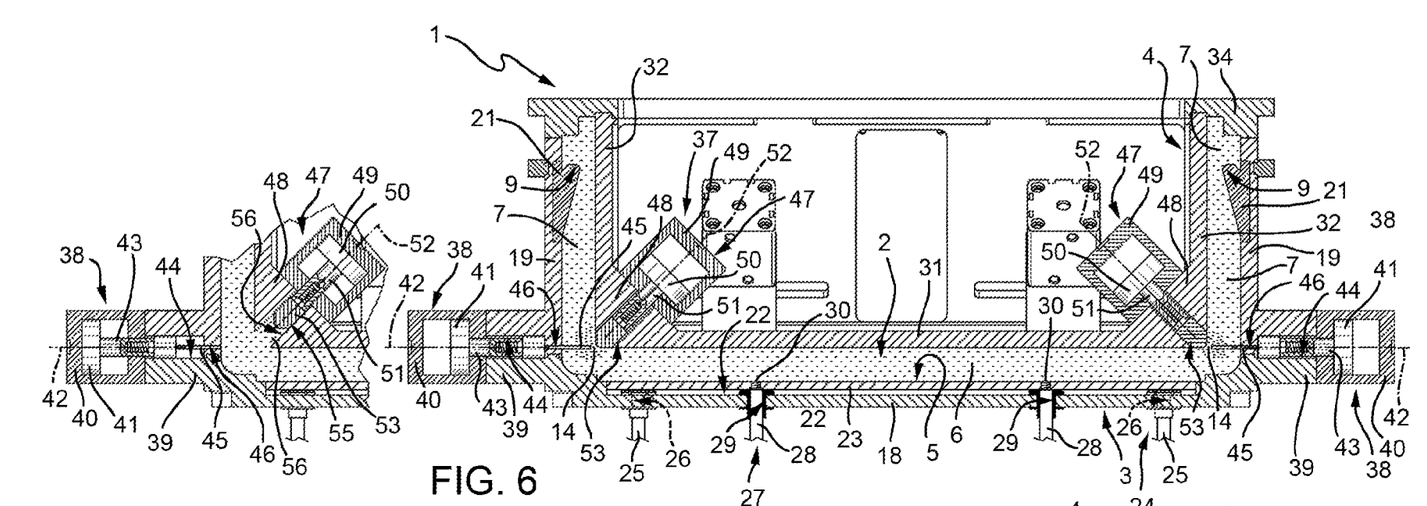
FIG. 6 shows a section along line VI-VI in FIG. 5.
Figure 7:
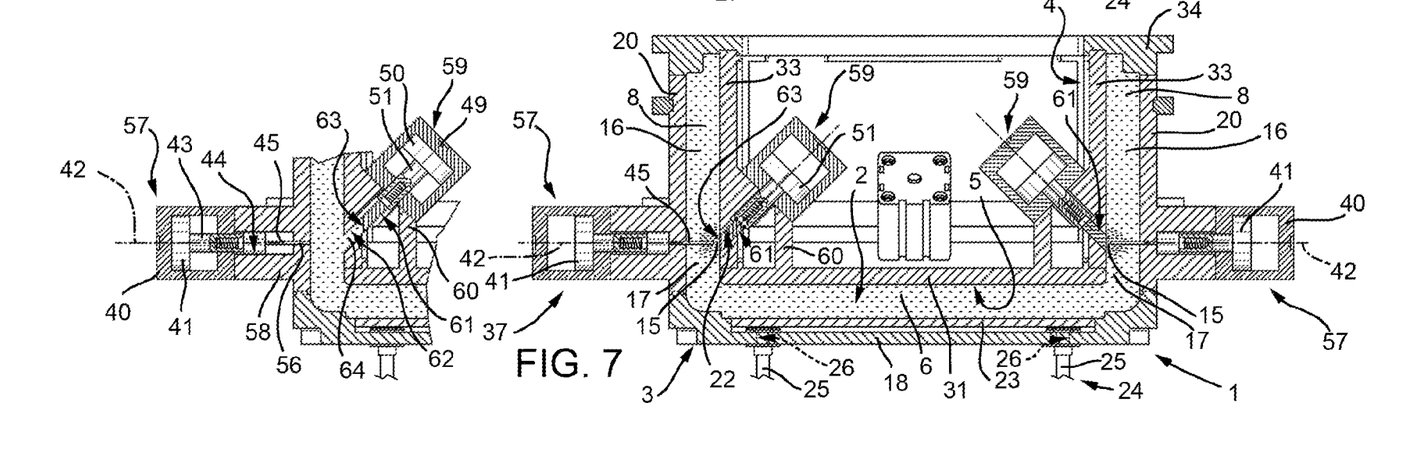
FIG. 7 shows a section along line VII-VII in FIG. 5.

As shown in FIGS. 1 and 4, mold 1 configured to mold container 2 comprises half-molds 3 and 4—a female half-mold 3 and a male half-mold 4—which are movable, with respect to each other and in a mating direction D, to and from said molding position (FIG. 1) defining molding chamber 5 (FIGS. 5, 6 and 7).

With particular reference to FIGS. 4 and 5, half-mold 3 is in the form of a parallelepiped-shaped box, and comprises a bottom wall 18 perpendicular to mating direction D; two lateral walls 19 extending along the short sides of bottom wall 18 and perpendicular to and connected rigidly to bottom wall 18; and two lateral walls 20 extending along the long sides of bottom wall 18, perpendicular to walls 19 and bottom wall 18, and connected rigidly to bottom wall 18. On the inner side facing the other wall 19, each wall 19 has a wedge-shaped insert 21 which is located centrally on wall 19, close to the top edge of wall 19, projects inwards of half-mold 3, and positively reproduces the shape of recess 9 formed on each wall 7 of container 2.

As shown in FIGS. 4, 6 and 7, bottom wall 18 has a rectangular center cavity 22 housing a plate 23, which forms part of a knockout device 24 configured to remove the molded container 2, after opening mold 1. In addition to plate 23, knockout device 24 also comprises a number or quantity of (in the example shown, but not necessarily, four) pushers 25, which are defined by rods extending through respective through holes 26 formed close to the corners of bottom wall 18, each have, on the axial end inside container 2, a flat head interposed between plate 23 and bottom wall 18, and are movable, in use, in a direction parallel to mating direction D, between a withdrawn position (FIG. 6) corresponding to said closed molding position of mold 1, and an extracted position (not shown) in which, after half-mold 4 is extracted, pushers 25 extend inside half-mold 3 to push plate 23 away from bottom wall 18 and so expel container 2 from half-mold 3.

Half-mold 3 is fitted with a feed device 27 configured to feed plastic material, normally in the form of granules, into molding chamber 5. Feed device 27 comprises a number or quantity of tubes 28 fitted, in fixed positions and with the interposition of bushings, through respective holes 29 in bottom wall 18, and having respective outlet nozzles 30, each of which fits slidably through a respective hole in plate 23, and terminates directly inside molding chamber 5.

With reference to FIGS. 4 and 6, half-mold 4, like half-mold 3, is in the form of a parallelepiped-shaped box, and comprises a flat bottom wall 31 perpendicular to mating direction D; two lateral walls 32 extending along the short sides of bottom wall 31 and perpendicular to and connected rigidly to bottom wall 31; and two lateral walls 33 extending along the long sides of bottom wall 31, perpendicular to walls 32 and bottom wall 31, and connected rigidly to bottom wall 31. The top free edge of half-mold 4 is fitted with a rectangular rim or flange 34 which projects transversely outwards of lateral walls 32 and 33 up to and beyond lateral walls 19 and 20 of hall-mold 3, and has a peripheral portion which rests on the top free edge of half-mold 3 to seal the top of molding chamber 5.

With reference to FIG. 5 and in particular to the enlarged detail, half-mold 4 has, close to its corners, four tabs 35 which, inside molding chamber 5, act as partitions to interrupt continuity of the material where walls 7 and 8 of container 2 join. More specifically, each tab 35 is fitted to a pad 36 set into a respective wall 33, along a corner of half-mold 4, and extends. parallel to wall 33, up to the wall 19 of half-mold 3 facing the corner fitted with tab 35. As shown in FIG. 4, each tab 35 extends from bottom wall 18 to flange 34 (i.e., along the full height of molding chamber 5), and is S-shaped to negatively reproduce, on one side, surface 11 and, on the other, surface 12 defining recessed joint 13.

Finally, mold 1 comprises a forming device 37 configured to form hinges 14 and 15, and which is configured to mold hinges 14 and 15, when molding container 2, by inserting inside molding chamber 5 parting members which cooperate in opposition to respective compression members configured to compact the material at the hinges 14, 15 to be formed.

As shown in FIGS. 5, 6 and 7, forming device 37 comprises, for each hinge 14, 15, at least one pair of hydraulic actuators located on opposite sides of molding chamber 5 to activate a parting member and a compression member respectively. The hydraulic actuators configured to activate the parting members are fitted in fixed positions to the outside of half-mold 3, and the hydraulic actuators configured to activate the compression members are fitted in fixed positions to the inside of half-mold 4.

More specifically, for each hinge 14 to be formed, forming device 37 comprises a hydraulic actuator 38 which is fitted rigidly to a supporting rib 39 fixed to an outer surface of a respective wall 7, and comprises a cylinder 40, and a piston 41 mounted to slide inside cylinder 40, along an axis 42 perpendicular to wall 7, and having a rod 43 which projects from one end of cylinder 40 and slides inside a hole 44 in rib 39. Rod 43 is fitted on its free end with a blade 45 which defines said parting member, extends in a plane through axis 42, parallel to bottom wall 18, and intersecting the edge connecting wall 32 and bottom wall 31 of half-mold 4, and is as long as the width of wall 7 (i.e., the distance between two tabs 35, measured parallel to respective wall 7).

Piston 41 moves blade 45 between a withdrawn rest position (shown in the enlarged detail of FIG. 6), in which blade 45 is completely outside molding chamber 5, and an end portion of the blade engages a slit 46 through wall 19; and an extracted work position (FIG. 6), in which blade 45 extends through slit 46 and projects inside molding chamber 5 by a length 'l' smaller than the thickness 's1' of wall 7.

Together with hydraulic actuator 38, forming device 37 comprises a hydraulic actuator 47 which is located inside half-mold 4, is fitted rigidly to a corner supporting rib 48 extending along the edge between a respective wall 32 and bottom wall 31, and comprises a cylinder 49, and a piston 50 mounted to slide inside cylinder 49, and having a rod 51 projecting from one end of cylinder 49 and mounted to slide along an axis 52 sloping roughly 45° with respect to bottom wall 31.

Rod 51 is fitted on its free end with a pad 53 which defines a compression member and is defined by a flat plate, which extends in a plane through axis 52 and intersecting the edge between wall 19 and bottom wall 31 of half-mold 4, engages a channel 54 formed through corner rib 48 and communicating with molding chamber 5, and is bounded on its free end 55 by two longitudinal edges forming a right-angle.

Pad 53 is the same length as respective blade 45, and is movable by piston 50 between a withdrawn rest position (shown in the enlarged detail of FIG. 6), in which pad 53 is completely outside molding chamber 5 and free end 55 defines, inside channel 54, a chamber 56 communicating with molding chamber 5; and an extracted work position (shown in FIG. 6), in which pad 53 completely engages chamber 56, and the right-angle free end 55 connects wall 32 and bottom wall 31.

As shown in FIG. 5, for each hinge 15 to be formed, forming device 37 comprises two pairs of opposite hydraulic actuators, each pair comprising an actuator configured to activate a parting member, and an actuator configured to activate a compression member. The reason for two pairs of opposite actuators is that, in the example shown, hinge 15 is actually divided into two parts (FIG. 3) separated by a section in which respective wall 8 is detached from bottom wall 6 of container 2. In a variation, hinge 15 may be continuous, in which case, forming device 37 comprises only one pair of opposite hydraulic actuators for each hinge 15.

As shown in FIG. 7, each pair of opposite actuators Comprises a hydraulic actuator 57 fixed to the outside of wall 20 of half-mold 3 by a supporting rib 58, identical to hydraulic actuator 38, and whose component parts are therefore indicated using the same reference numbers as for actuator 38. In the case of hydraulic actuator 57, blade 45 lies in a plane parallel to bottom wall 31 of half-mold 4 and at a height, with respect to bottom wall 31, equal to the thickness 's1' of walls 7 of container 2. Like hydraulic actuator 38, blade 45 of hydraulic actuator 57 is movable between a withdrawn rest position (shown in the enlarged detail of FIG. 7), in which blade 45 is completely outside molding chamber 5, and an end portion of the blade engages a slit 46 through wall 20; and an extracted work position (FIG. 7), in which blade 45 extends through slit 46 and projects inside molding chamber 5 by a length smaller than a thickness 's2' of wall 8. In the example shown, thicknesses 's2' and 's1' are the same, but, in a variation (not shown), may differ.

Together with hydraulic actuator 57, forming device 37 comprises a hydraulic actuator 59 which is located inside half-mold 4, is fitted rigidly to a supporting bracket 60, and is identical to hydraulic actuator 47 described above, except for the compression member. In this case, hydraulic actuator 59 comprises a pad 61 which is defined by a flat plate lying in a plane sloping roughly 45° with respect to wall 33, engages a channel 62 formed through wall 33 and communicating with molding chamber 5, and is bounded on its free end by a surface 63 parallel to wall 33.

Pad 61 is movable, in use, between a withdrawn rest position (shown in the enlarged detail of FIG. 7), in which pad 61 is completely outside molding chamber 5 and end surface 63 defines, inside channel (64; 62) 62, a chamber 64 communicating with molding chamber 5; and an extracted work position (FIG. 7), in which pad 61 completely engages chamber 64 and surface 63 is coplanar with the outer surface of wall 33.

In connection with the above, it should be pointed out that, unlike the example described and illustrated, in certain not shown variations, the respective heights—measured as the distance from bottom wall 6—of the two pairs of hydraulic actuators 38, 47 may differ from one another and also from the heights of pairs of hydraulic actuators 57, 59. Generally speaking, the location of each pair of hydraulic actuators 38, 47 and 57, 59 depends on the location of the hinge to be formed on the relative lateral wall 7, 8. If, for example, lateral walls 7 are of such a height as to be superimposed when collapsed onto bottom wall 6, one of the two hinges 14 will extend along the area where wall 7 joins to bottom wall 6, while the other hinge 14 will be located at a distance 's1' from bottom wall 6 (where 's1' is the thickness of walls 7). In which case, hinges 15 will be located at the same distance '2s1' from bottom wall 6, if walls 8 are coplanar when collapsed, or will be located at different heights (i.e., at respective distances '2s1' and '2s1+s2' from bottom wall 6, if walls 8 are superimposed when collapsed).

Operation of mold 1 will now be described as of the position shown in the FIGS. 6 and 7 details. In this position, half-molds 3 and 4 are in the closed molding position, and hydraulic actuators 38, 57, 47 and 59 are all idle (i.e., with blades 45 and pads 53, 61 respectively in the withdrawn rest configuration).

At this point, molding chamber 5 is injected with the plastic material by feed device 27, and with various operating fluids (compressed air, water, etc.) fed along known channels (not shown) communicating with molding chamber 5.

Once the plastic material has filled molding chamber 5 and penetrated chambers 56 and 64 of channels 54 and 62, forming device 37 is activated to move blades 45 and pads 53 and 61 into their respective extracted work positions (FIGS. 6 and 7).

As blade 45 and pad 53 (FIG. 6) in each pair of hydraulic actuators 38 and 47 are moved towards each other, this on the one hand separates respective wall 7 partly from bottom wall 6 and, on the other, compresses the material in chamber 56 against the end of blade 45. This results in the formation, in the space between blade 45 and the free end 55 of pad 53, of a bead of material of a transverse width equal to 's−1' (where 's' is the thickness of wall 7, and 1 the measurement of the extent to which blade 45 penetrates molding chamber 5), of a greater density than the material of wall 7, and defining a respective hinge 14.

Likewise, as blade 45 and pad 61 (FIG. 7) in each pair of hydraulic actuators 57 and 59 are moved towards each other, this on the one hand separates respective wall 8 partly from bottom wall 6 and, on the other, compresses the material in chamber 64 against the end of blade 45. This results in the formation, in the space between blade 45 and the end surface 63 of pad 61, of a bead of material of a transverse width equal to 's−1' (where 's' is the thickness of wall 8, and 1 the measurement of the extent to which blade 45 penetrates molding chamber 5), of a greater density than the material of wall 8, and defining a respective hinge 15.

After a sufficient time lapse to enable the plastic material to set, hydraulic actuators 38, 47, 57 and 59 are moved back into their respective withdrawn rest configurations, half-mold 4 is removed from half-mold 3, and knockout device 24 is activated to remove container 2 from half-mold 3 utilizing pushers 25 and plate 23.

The advantages of the molding method and mold 1 described will be clear from the above description. More specifically, they provide for producing a collapsible container 2 already in the erect configuration, and which, if necessary, can be folded into the flat configuration later. As a result, compared with conventional molds configured to mold open containers (i.e., in the form of blanks), mold 1 is relatively compact, so each machine can be fitted with a greater number or quantity of molds to increase output of the machine.

Finally, by forming hinges 14 and 15 and recessed joints 13 between walls 7 and 8 with container 2 in the erect configuration, the areas joining and connecting the moving parts of container 2 are shaped more accurately, thus increasing the rigidity and stability of container 2, and the resistance of container 2 to repeated assembly and disassembly.

Clearly, changes may be made to the embodiments of the present disclosure described with reference to the attached drawings without, however, departing from the protective scope of the accompanying Claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A mold configured to mold a collapsible, foam plastic container including a bottom wall, two facing first lateral walls, and two facing second lateral walls substantially perpendicular to the first lateral walls, said lateral walls movable between a work configuration in which the first and second lateral walls are substantially perpendicular to one another and to the bottom wall, and a flat rest configuration in which the first and second lateral walls are substantially parallel to one another and to the bottom wall, the mold comprising:
   a first half-mold;
   a second half-mold, wherein the first half-mold and the second half-mold are movable with respect to each other to and from a closed molding position in which the two half-molds define, between them, a molding chamber, said molding chamber being in communication with a chamber which is filled with a designated quantity of material when the molding chamber is filled, and
   a forming device configured to form, for each lateral wall, a hinge which enables said lateral wall to rotate with respect to the bottom wall, said forming device including:
   for each hinge to be formed, a parting member movable between a rest position outside the molding chamber and a work position in which the parting member extends inside the molding chamber at a location corresponding to the hinge to be formed, and a compression member located on an opposite side of the molding chamber to the parting member and which is movable between a rest position outside the molding chamber and a work position in which the compression member: (i) compresses a quantity of plastic material towards the parting member, and (ii) cooperates with the parting member to form, on the lateral wall, a relatively higher-density portion defining the hinge, wherein each compression member includes a pad which extends facing the respective parting member on the opposite side of the molding chamber and slidably engages a channel formed in the second half-mold.

2. The mold of claim 1, which includes an actuator configured to activate the forming device, said actuator including a respective hydraulic actuator for each parting member and each compression member.

3. The mold of claim 1, wherein each parting member is fitted to the first half-mold which is an outer half-mold, and each compression member is fitted to the second half-mold which is an inner half-mold, the parting member being movable from the outside inwards of the molding chamber such that said relatively higher-density portion is located on the side of the lateral wall facing inwards of the container to enable the lateral wall, in use, to rotate inwards of the container.

4. The mold of claim 1, wherein each parting member includes a blade which is moved in a plane perpendicular to the lateral wall and substantially parallel to the bottom wall to penetrate, in the work position, the molding chamber by an amount which is less than a thickness of the lateral wall.

5. The mold of claim 1, wherein in the work position, the pad occupies a whole of said chamber.

6. The mold of claim 1, which includes four dividing tabs, each of which extends through the molding chamber from the first half-mold to the second half-mold, to separate a first of the lateral walls from a second of the lateral walls, each dividing tab being shaped to impart to end surfaces of the first lateral wall and the second lateral wall separated by the dividing tab, respective complementary shapes, which together define a recessed joint configured to firmly and releasably connect the first lateral wall and the second lateral wall in the work position.

\* \* \* \* \*